United States Patent
Hsiao

(10) Patent No.: US 11,947,345 B2
(45) Date of Patent: Apr. 2, 2024

(54) SYSTEM AND METHOD FOR INTELLIGENTLY MONITORING A PRODUCTION LINE

(71) Applicant: MEMORENCE AI CO., LTD., Taipei (TW)

(72) Inventor: Pai-Heng Hsiao, Taipei (TW)

(73) Assignee: MEMORENCE AI CO., LTD., Taipei (TW)

(*) Notice: Subject to any disclaimer, the term of this patent is extended or adjusted under 35 U.S.C. 154(b) by 516 days.

(21) Appl. No.: 17/147,231

(22) Filed: Jan. 12, 2021

(65) Prior Publication Data
US 2021/0216062 A1 Jul. 15, 2021

(30) Foreign Application Priority Data
Jan. 13, 2020 (TW) .................. 109101082

(51) Int. Cl.
G05B 19/418 (2006.01)
G06F 18/214 (2023.01)
(Continued)

(52) U.S. Cl.
CPC ... G05B 19/41875 (2013.01); G05B 19/4183 (2013.01); G05B 19/41865 (2013.01);
(Continued)

(58) Field of Classification Search
CPC .......... G05B 19/41875; G05B 19/4183; G05B 19/41865; G06V 20/52; G06V 10/82;
(Continued)

(56) References Cited

U.S. PATENT DOCUMENTS

| | | | |
|---|---|---|---|
| 8,116,575 B1 * | 2/2012 | Saisan | G06V 10/764 382/160 |
| 10,937,168 B2 * | 3/2021 | Wang | G06F 18/2415 |

(Continued)

FOREIGN PATENT DOCUMENTS

EP  4080406 A1 * 10/2022 ....... G05B 19/41875

*Primary Examiner* — Manav Seth
(74) *Attorney, Agent, or Firm* — Muncy, Geissler, Olds & Lowe, P.C.

(57) ABSTRACT

System and method for intelligently monitoring the production line that can monitor an inspected object image captured by an image capturing device, thereby allowing an operating station host to provide a labeling module to reinspect a classification decision of a classifier subsystem, to achieve the purpose of verifying the classification decision or checking whether there are missed inspections. In addition, the classifier subsystem can automatically filter out classification decisions with lower reliability to effectively reduce the number of reinspection. Moreover, a group of inspected object images can be analyzed first to obtain image difference features through comparison, which is suitable for insufficient training samples. Furthermore, the labeling module can simultaneously reinspect highly relevant historical classification decisions. Meanwhile, a second image capturing device is provided, so that the system can automatically label defect positions based on the inspected object image before and after repair, thereby learning to judge whether defects occur.

21 Claims, 13 Drawing Sheets

(51) Int. Cl.
  *G06F 18/24* (2023.01)
  *G06V 10/764* (2022.01)
  *G06V 10/778* (2022.01)
  *G06V 10/82* (2022.01)
  *G06V 20/52* (2022.01)

(52) U.S. Cl.
  CPC .......... *G06F 18/2155* (2023.01); *G06F 18/24* (2023.01); *G06V 10/764* (2022.01); *G06V 10/7784* (2022.01); *G06V 10/82* (2022.01); *G06V 20/52* (2022.01)

(58) Field of Classification Search
  CPC .. G06V 10/7784; G06V 10/764; G06F 18/24; G06F 18/2155
  See application file for complete search history.

(56) References Cited

U.S. PATENT DOCUMENTS

| | | | |
|---|---|---|---|
| 10,991,088 B2* | 4/2021 | Ambikapathi | G06V 10/764 |
| 2020/0003828 A1* | 1/2020 | Ambikapathi | G06F 18/24765 |
| 2020/0005422 A1* | 1/2020 | Subramanian | G06T 7/194 |
| 2021/0142456 A1* | 5/2021 | Varga | G06N 3/08 |

* cited by examiner

SYSTEM AND METHOD FOR INTELLIGENTLY MONITORING A PRODUCTION LINE

BACKGROUND OF INVENTION

(1) Field of the Invention

The present disclosure relates to the technical fields such as machine learning, image recognition, image processing, and defect inspection, more particularly to a system and a method for intelligently monitoring the production line which are able to improve inspection efficiency and accuracy, to re-check the inspection result of a classifier, to adjust historical interpretation data, and is suitable for inspected objects with a small number of defect training samples, and to prevent the defect from the missed inspection.

(2) Brief Description of Related Art

With the advancement of science and technology, people have increasingly higher requirements for the precision of electronic components. In order to ensure the high product yield, two stages of optical inspection and reinspection are usually carried out in the production process of electronic components, wherein an automatic appearance inspection device is configured to obtain images of an inspected object and determine whether the inspected object has defects in the optical inspection stage, and the defects judged in the optical inspection stage are further checked and labeled manually in the reinspection stage.

The inspection efficiency of the automatic appearance inspection device is better than that of the traditional manual inspection method, and it can reduce the large amount of manpower consumed in the production process. However, if the inspection of the automatic appearance inspection device is wrong or missed, it may pass defective products to the client. Moreover, in order to reduce the workload in the reinspection stage, the operator can often only perform inspection and labeling on the inspected object images judged to be defective by the automatic appearance inspection device, and cannot perform inspection and labeling on the whole or other part of the inspected object images.

Currently, because the operator still has to inspect and label each defective image judged by the automatic appearance inspection device in the reinspection stage, there is still the disadvantage of high manpower consumption. In addition, there may be a certain probability of missed inspection due to human visual fatigue and other reasons. If the number of defect training samples for some electronic components is insufficient, the operator in the reinspection stage may need to judge by himself whether each image of the inspected object is defective and label it because it is difficult for the automatic appearance inspection device to determine whether there is a defect on the electronic components. Therefore, for a very small number of defects, there are still disadvantages of large manpower consumption in the reinspection stage.

As mentioned above, the conventional system still has the above shortcomings. Therefore, it is a problem to be solved how to propose a defect inspection technology that is based on the human-machine collaboration model, can improve the industrial process, improve the efficiency and accuracy of defect inspection, can be applied to the inspected object with a small number of training samples, and can prevent defect features from the missed inspection.

SUMMARY OF INVENTION

Based on the above-mentioned problems, it is a primary object of the present disclosure to provide a system for intelligently monitoring the production line to monitor an inspected object image of an inspected object captured by an image capturing device. The system mainly includes a training subsystem, an operating station host, and a classifier subsystem. The training subsystem includes a training module corresponding to types of the inspected object. The operating station host includes a labeling module. The classifier subsystem can read the training module to analyze image features of the inspected object image and make a first classification decision to transmit to the operating station host. If the first classification decision is regarded as abnormal, the first classification decision can include a complete image, and an abnormal image with at least one reinspection label. The labeling module can input a first reinspection operation associated with the abnormal image to update the first classification decision, which is transmitted by the operation station host to the training subsystem. The labeling module is also configured to label a missed inspection label associated with the complete image for inputting a second reinspection operation to generate a second classification decision replacing the first classification decision. The second classification decision is transmitted to the training subsystem by the operating station host. Thereafter, the training subsystem can update the training module, and a label database connected to the training module in real time according to an updated classification decision and the second classification decision.

According to another embodiment of the present disclosure, the present disclosure further includes an image correlation analysis module which is provided to analyze a group of inspected object images composed of a plurality of the inspected object images. If there is a difference between the inspected object images, at least one image difference feature can be obtained by comparison of the group of the inspected object images. Accordingly, the classifier subsystem can analyze the image difference feature generated by the image correlation analysis module and make a first classification decision.

According to a further embodiment of the present disclosure, the present disclosure further includes a second image capturing device which is provided for capturing images of the inspected object repaired based on the abnormal image to obtain at least one repaired inspected object image. Meanwhile, at least one image difference feature between the inspected object image and the repaired inspected object image can be labeled. Thereafter, the labeled image difference feature and the repaired inspected object image are transmitted to the training subsystem.

In addition to the above-mentioned functions, the classifier subsystem can include a label screening unit. The label screening unit can screen out classification decisions with lower reliability, which will be transmitted to the operating station host by the classifier subsystem.

In addition to the above-mentioned functions, the operating station host can include a historical label reinspection module. A historical classification decision that is highly related to the classification decision can be displayed on the historical label reinspection module. The historical label reinspection module can input a third reinspection operation related to the historical classification decision for updating the historical classification decision stored in the training subsystem.

DETAILED DESCRIPTION OF PREFERRED EMBODIMENTS

Figure 1:
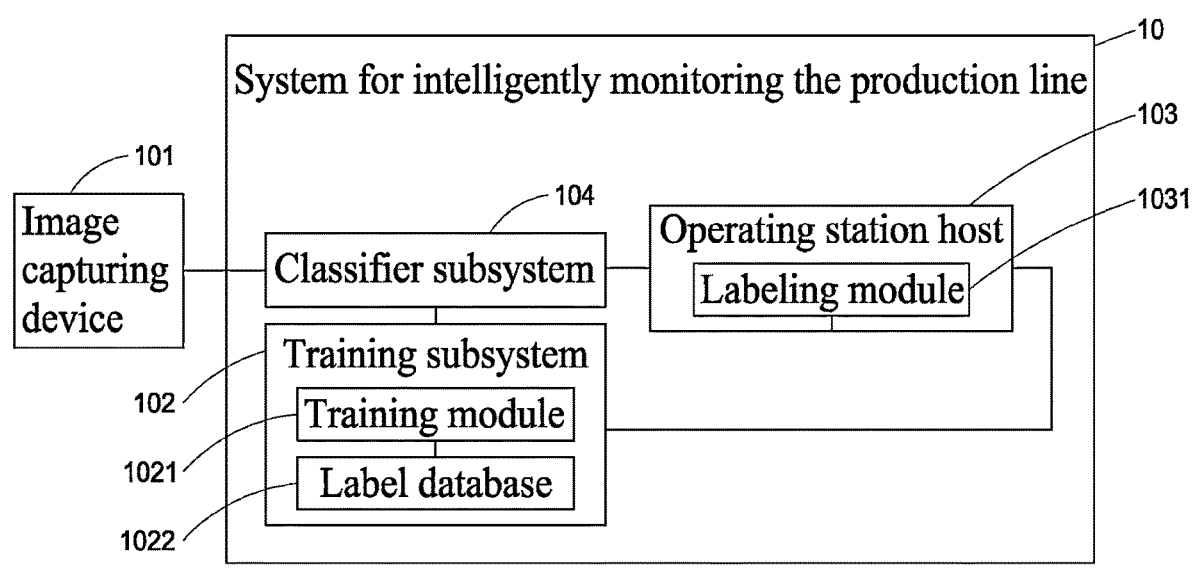
FIG. 1 is a block diagram I of a first embodiment of the present disclosure.
Figure 2:
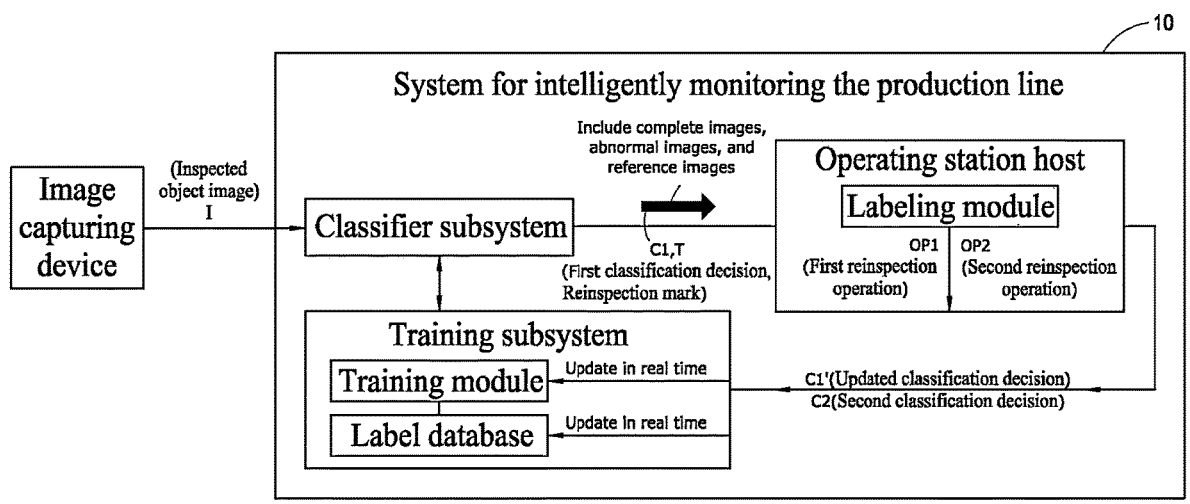
FIG. 2 is a block diagram II of the first embodiment of the present disclosure.
Figure 3:
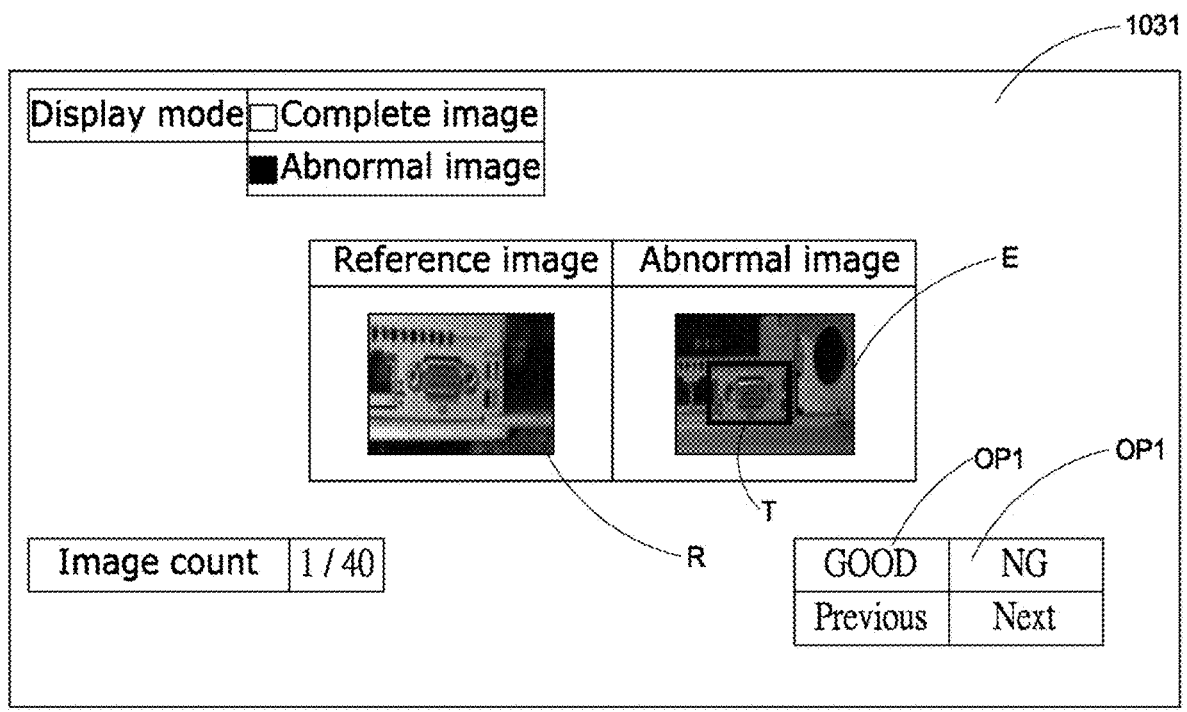
FIG. 3 is a schematic diagram of a reinspection operation of the first embodiment of the present disclosure.

With reference to FIGS. 1 through 3, a system 10 for intelligently monitoring the production line according to a first embodiment of the present disclosure is able to monitor an inspected object image I of an inspected object captured by an image capturing device 101. The system 10 for intelligently monitoring the production line mainly includes a training subsystem 102, an operating station host 103, and a classifier subsystem 104. The classifier subsystem 104 can communicate with the image capturing device 101, the training subsystem 102, and the operating station host 103 through a network, respectively.

The image capturing device 101 may include a plurality of image sensing units (not shown). The image sensing units can be a charge coupled device (CCD) or a complementary metal oxide semiconductor (CMOS) device. The image capturing device 101 may further include at least one lens (not shown) for focusing the inspected object image I on the image sensing unit.

The training subsystem 102 can store at least one training module 1021 corresponding to types of inspected object (for example, corresponding to a specific material number). The training module 1021 can be LeNet, AlexNet, VGGnet, NIN, GoogLeNet, MobileNet, SqueezeNet, ResNet, SiameseNet, NASNet, RNN or other training models based on convolutional neural networks, but not limited thereto. A part of training models can correspond to training models for tasks such as object detection, object cutting, object classification, etc. Moreover, the training module 1021 can be connected to a label database 1022. The label database 1022 can be a database host, or a collection of multiple data tables stored in the training subsystem 102. The label database 1022 can store multiple pre-training data sets, such as pre-labeled classification decisions and corresponding training sample images. The label database 1022 can also store multiple inspected object images I and multiple corresponding classification decisions that can be updated at any time. For example, a return data from the operating station host 103 can be updated. Meanwhile, the first classification decision can be an updated classification decision C1', and/or a second classification decision C2. Details thereof are described below.

The operating station host 103 is connected to the training subsystem. The operating station host 103 includes a labeling module 1031. The operating station host 103 can also read the training subsystem 102 to adjust weight parameters of the training model of each training module 1021 in real time via the network, or adjust the pre-training data set used by the training module 1021 through the network.

The classifier subsystem 104 can read the training module 1021 to analyze image features of the inspected object image I and make a first classification decision C1 which is transmitted to the operating station host 103. If the first classification decision C1 is regarded as abnormal, the first classification decision C1 can include a complete image and an abnormal image with at least one reinspection label T. Preferably, the first classification decision C1 according to the first embodiment can further includes a reference image. Preferably, before the classifier subsystem 104 makes the first classification decision C1, the classifier subsystem 104 or the image capturing device 101 may first perform an image processing program on the inspected object image I. The aforementioned image processing program can be defined as one or a combination of an image preprocessing program, an image segmentation program, and a feature retrieval program. Preferably, the inspected object image I received by the classifier subsystem 104 from the image capturing device 101 may also be multiple abnormal inspected object images filtered out by the image capturing device 101 based on an automatic optical inspection (AOI) technology. In addition, the aforementioned abnormal inspected object image can also include a defect position information corresponding to the reinspection label T.

The labeling module 1031 can input a first reinspection operation OP1 associated with the abnormal image to generate an updated classification decision C1', which is transmitted to the training subsystem 102 by the operating station host 103. The labeling module 1031 can also label a missed inspection label (not shown) associated with the complete image to input a second reinspection operation OP2 for generating a second classification decision C2 that replaces the first classification decision C1 and is transmitted to the training subsystem 102 by the operating station host 103.

The labeling module 1031 can be presented on a display screen of the operating station host 103 in the form of a graphical user interface (GUI). As shown in FIG. 3, the first classification decision C1 can include the complete image, the reinspection label T, a reference image R, and an abnormal image E. The first reinspection operation OP1 can be done by triggering a "GOOD" button or a "NG" button. The complete image can be presented by, for example, switching the display mode, but it is not limited thereto.

Accordingly, the training module 1021 and the label database 1022 connected to the training module 1021 can be updated by the training subsystem 102 in real time according to the updated classification decision C1' and the second classification decision C2. In other words, the updated classification decision C1' and the second classification decision C2 can be input into the pre-training data set of the label database 1022 in real time. In this way, the training module 1021 can train the training model of the training module 1021 in real time according to the updated pre-training data set.

As an example, the inspected object may be a printed circuit board (PCBA), a fastener, a flexible printed circuit board, a rubber product, a medical image (such as X-ray, ultrasonic wave, CT, MRI and other images), a digital pathology image, or an image sensor, but not limited thereto. If the printed circuit board is inspected, it can be monitored for short circuit, empty solder, excessive tin, little tin, tin hole, foreign body, etc. If the fastener is inspected, it can be monitored for scratches, foreign objects, missing corners, etc. If the flexible printed circuit boards or rubber products are inspected, they can be monitored for scratches, burrs, missing corners, foreign objects, etc. If the image sensor is inspected, it can be monitored for defects, foreign objects, etc. If medical images are inspected, they can be monitored for the lesion.

According to the first embodiment of the present disclosure, the operation station host 103 can not only inspect the abnormal image with the reinspection label T, but also inspect and label the complete inspected object image I. Therefore, unlike the conventional method in which the operator can only inspect and label the defect image transmitted by the automatic appearance inspection device, the present disclosure allows the operating station host 103 to separately monitor the complete image, and the abnormal image judged to be abnormal by the classifier subsystem 104 during the reinspection stage, thereby preventing the abnormal inspected objects missed by the classifier subsystem 104 from being transported to the next stage of the production line. Accordingly, the beneficial effect of reducing the probability of defective products passing to the client can be achieved. For example, the inspected object is a general screw. Since the repair cost (internal cost) may generally be higher than the return cost (external cost) claimed by the client, the embodiment is particularly suitable for such an object that does not require immediate repair.

Figure 4:
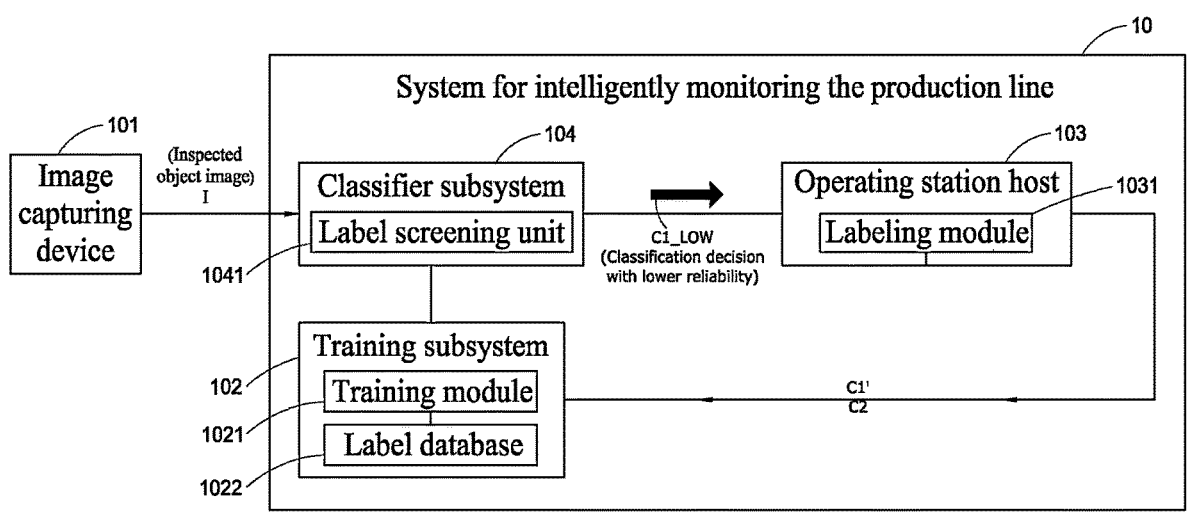
FIG. 4 is a block diagram of a variation of the first embodiment of the present disclosure.
Figure 5:
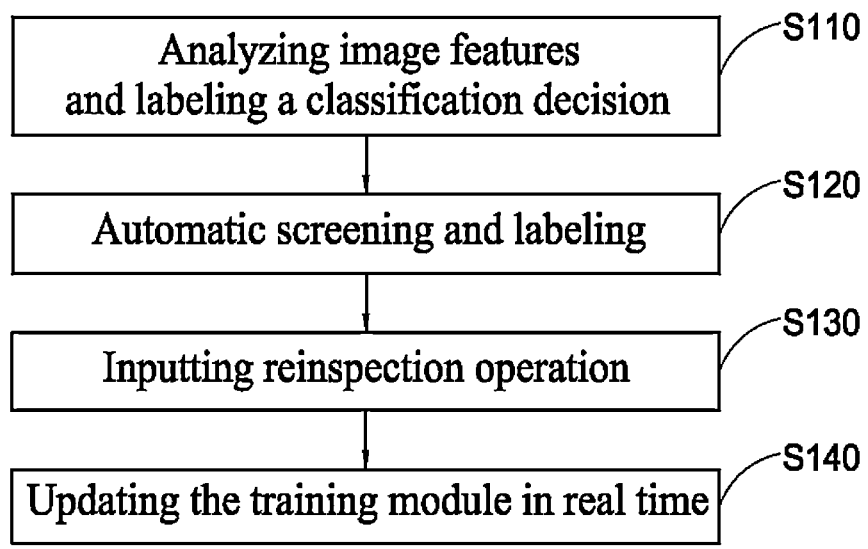
FIG. 5 is a method flowchart according to the variation of the first embodiment of the present disclosure.

Refer to FIG. 4 and FIG. 5, the classifier subsystem 104 of the system 10 for intelligently monitoring the production line further includes a label screening unit 1041 that is adjustable to an on state or an off state. The present disclosure proposes a method for intelligently monitoring the production line S1. After the classifier subsystem 104 analyzes the image features of the inspected object image I and makes the first classification decision (step S110: analyzing image features and making a classification decision), the label screening unit 1041 can automatically select a classification decision with lower reliability C1_LOW according to a confidence score corresponding to each reinspection label T. The classification decision with lower reliability C1_LOW may include the reinspection label T and the abnormal image. Preferably, the classification decision with lower reliability C1_LOW in the first embodiment also includes the reference image. The classifier subsystem 104 can transmit the classification decision with lower reliability C1_LOW to the operating station host 103 (step S120: automatic screening and labeling). The labeling module 1031 continues to generate the updated classification decision C1' and/or the second classification decision C2 according to the classification decision with lower reliability C1_LOW (step S130: inputting reinspection operation). Meanwhile, the label database 1022 and the training module 1021 of the training subsystem 102 are updated (step S140: updating the training module in real time). In this way, the reinspection label T with higher reliability and its corresponding abnormal image will no longer need to be reinspected by the operating station host 103. As a result, the labeling module 1031 of the operating station host 103 does not need to verify (or re-judge) the reinspection label T one-to-one for each abnormal image. Accordingly, the number of reinspection operations input by the operating station host 103 can be reduced, thereby lowering the manpower consumption at the reinspection stage.

Figure 6:
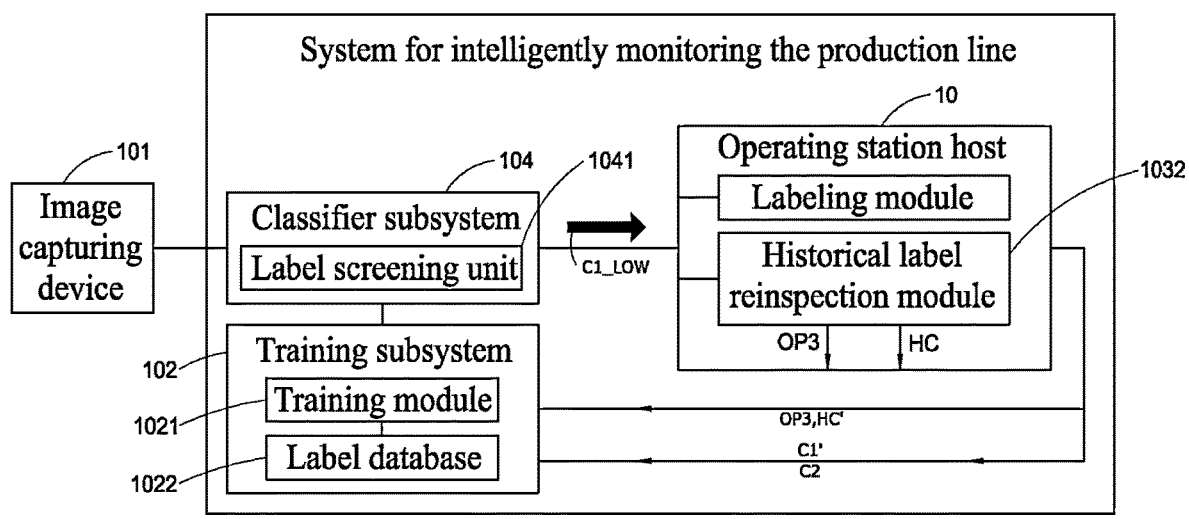
FIG. 6 is a block diagram of another variation of the first embodiment of the present disclosure.

Referring to FIG. 6 and FIG. 2, the operating station host 103 of the system 10 for intelligently monitoring the production line of the first embodiment includes a historical label reinspection module 1032 which can display a historical classification decision HC highly related to the first classification decision C1 so that the labeling module 1031 of the operating station host 103 has the opportunity to correct the previously misjudged classification decision at the moment of entering the first reinspection operation OP1 and/or the second reinspection operation OP2, which can prevent that the operating station host 103 receives an incorrect first classification decision C1 from the classifier subsystem 104 again so that it can be regarded as a further improvement. The historical label reinspection module 1032. The historical classification decision HC may include a historical image with at least one historical label. Especially, if the first classification decision C1 received by the operating station host 103 includes an abnormal image with a "short circuit" feature, the historical label reinspection module 1032 can read from the label database 1022 of the training subsystem 102 the historical classification decision HC that also contains the "short circuit" feature and has not been classified as an "abnormal" historical image (i.e., previously rejudged as good). The historical label reinspection module 1032 of the first embodiment can input a third reinspection operation OP3 associated with the historical classification decision HC to modify the past historical classification decision HC. In this way, the historical classification decision HC originally stored in the training subsystem 102 is updated to an updated historical classification decision HC'. In other words, the updated historical classification decision HC' will be instantly input into the pre-training data set of the label database 1022. Accordingly, the training module 1021 can train the training model stored by the training module 1021 in real time according to the updated pre-training data set.

Figure 7:
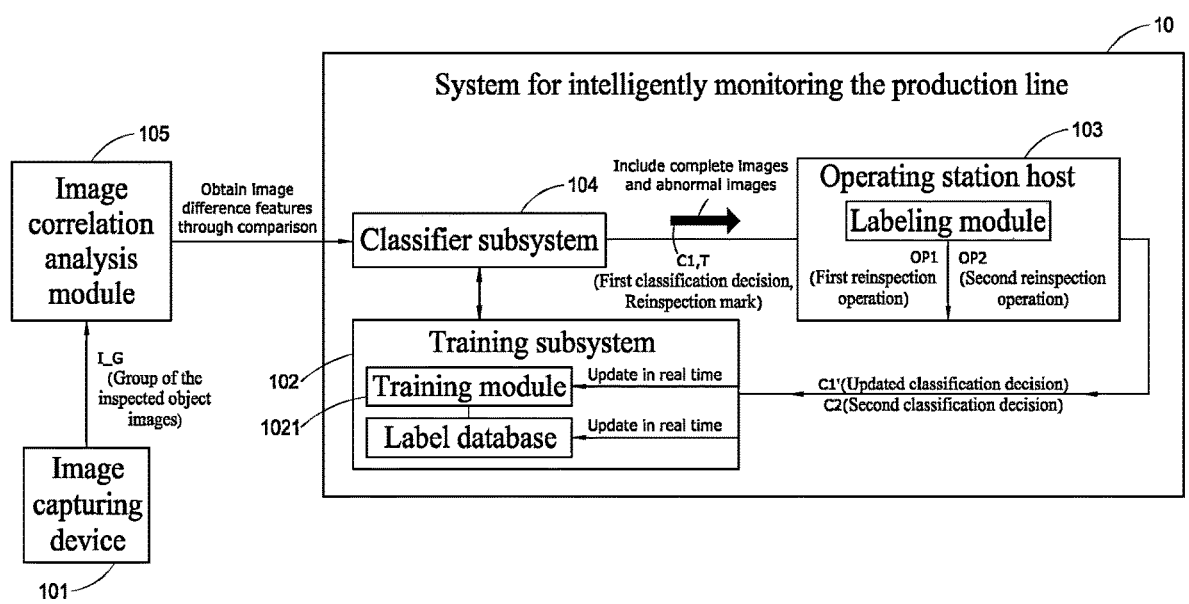
FIG. 7 is a block diagram of a second embodiment of the present disclosure.
Figure 8:
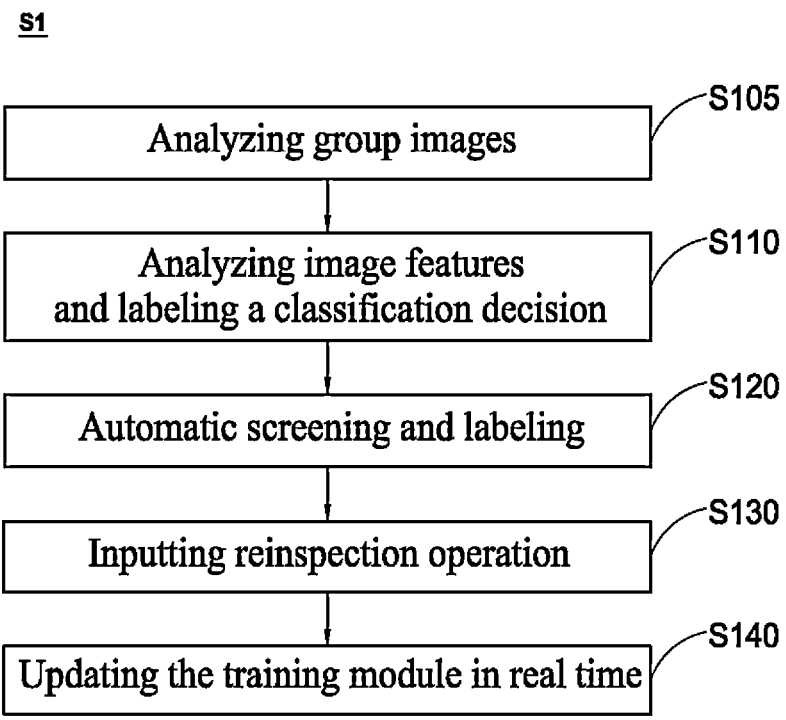
FIG. 8 is a method flowchart of the second embodiment of the present disclosure.

FIG. 7 and FIG. 8 illustrate a second embodiment of the present disclosure. The second embodiment employs the same technology as the first embodiment shown in FIGS. 1 through 3. The main difference lies in that the system 10 for intelligently monitoring the production line according to the second embodiment further includes an image correlation analysis module 105 connected to the image capturing device 101. Therefore, after the image capturing device 101 in the method for intelligently monitoring the production line S1 completes the image capturing of the inspected object, the image correlation analysis module 105 may first analyze a group of the inspected object images I_G composed of multiple inspected object images I (step S105: analyzing a group of images). If there is a difference between the multiple inspected object images I, the image correlation analysis module 105 can obtain at least one image difference feature by comparison of the group of the inspected object images I_G. For example, the difference in the specific image position among the inspected object images I can be captured, and the first classification decision C1 can be made. If there is no difference between the multiple inspected object images I, the image correlation analysis module 105 can directly transmit the multiple inspected object images I to the classifier subsystem 104. The classifier subsystem 104 directly analyzes the image features of the multiple inspected object images I, and makes the first classification decision C1. The classifier subsystem 104 of the second embodiment can be respectively connected to the training subsystem 102, the image correlation analysis module 105, and the operating station host 103. The classifier subsystem 104 of the second embodiment can read the training module 1021 to analyze the image difference feature of the group of the inspected object images I_G. Meanwhile, the first classification decision C1 will be made and transmitted to the operating station host 103. The information that can be included in the first classification decision C1, the information that can be input by the labeling module 1031, and the information that can be transmitted by the operating station host 103 to the training subsystem 102 are similar to those in the first embodiment so that no further descriptions thereto are given hereinafter.

According to the second embodiment of the present disclosure, the multiple inspected object images I (original images) captured by the image capturing device 101 or the abnormal inspected object images filtered by the image capturing device 101 based on automatic optical inspection (AOI) technology are regarded by the image correlation analysis module 105 as the group of the inspected object images I_G. Meanwhile, the image difference feature comparison will be performed. It can be applied to the situation where there are generally few abnormal inspected object images (i.e., training samples of defect images). Moreover, the aforementioned abnormal inspected object image may further include the defect position information corresponding to the reinspection label T.

Figure 9:
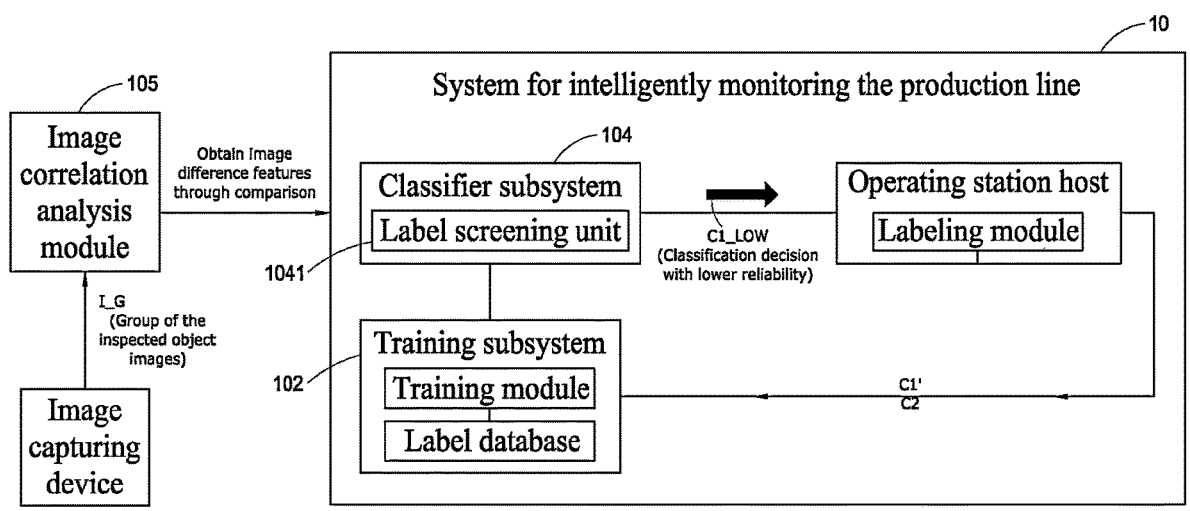
FIG. 9 is a schematic block diagram of a variation of the second embodiment of the present disclosure.

With reference to FIGS. 9 and 1, the classifier subsystem 104 of the system 10 for intelligently monitoring the production line may further include a label screening unit 1041. The label screening unit 1041 may, for example, screen out the first classification decision C1 with lower reliability based on a confidence score corresponding to each reinspection label (T, . . . ). The classification decision with lower reliability C1_LOW can include the reinspection labels T and the abnormal images. Preferably, the classification decision with lower reliability C1_LOW of the second embodiment may further include the reference images. The classifier subsystem 104 may transmit the classification decision with lower reliability C1_LOW to the operating station host 103; then, the labeling module 1031 will continue to generate the updated classification decision C1' and/or the second classification decision C2. Due to the labeling module 1031 of the second embodiment, the user does not need to verify (or re-judge) the reinspection label T one-to-one for each abnormal image. Accordingly, the number of reinspection operations input by the operating station host 103 can be reduced, thereby lowering the manpower consumption.

Figure 10:
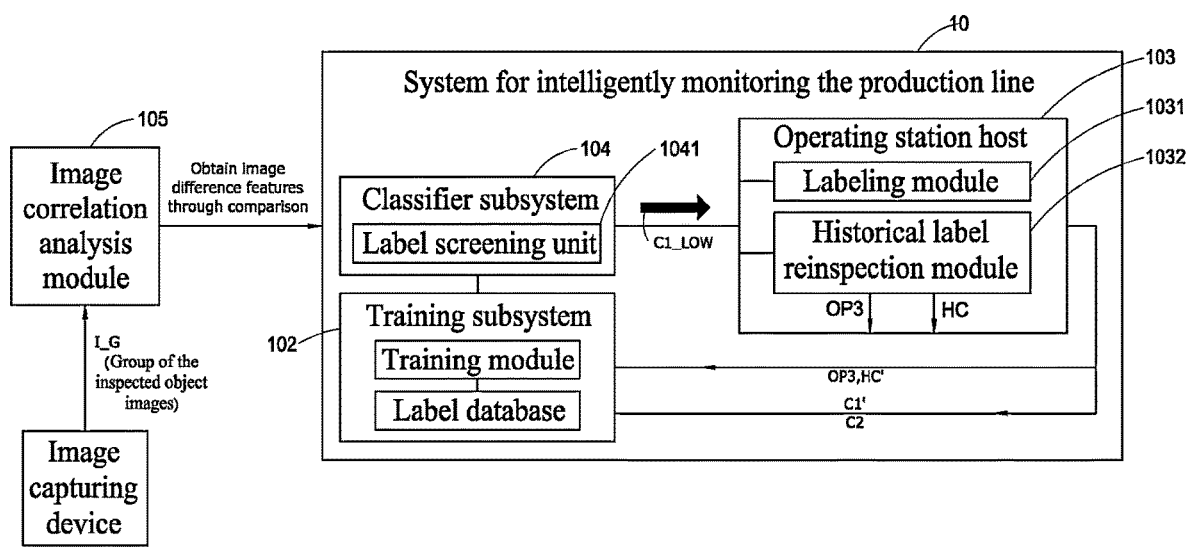
FIG. 10 is a schematic block diagram of another variation of the second embodiment of the present disclosure.

According to FIG. 10, the operating station host 103 of the system 10 for intelligently monitoring the production line includes a historical label reinspection module 1032. The historical label reinspection module 1032 can display a historical classification decision HC that is highly related to the first classification decision C1. The historical classification decision HC may include a historical image with at least one historical label. The historical label reinspection module 1032 can be used to input a third reinspection operation OP3 related to the historical classification decision HC to modify the past classification decision. In this way, the historical classification decision HC originally stored in the training subsystem 102 is updated to an updated historical classification decision HC'. In other words, the updated historical classification decision HC' will be instantly input into the pre-training data set of the label database 1022. Accordingly, the training module 1021 can train the training model stored by the training module 1021 in real time according to the updated pre-training data set.

Figure 11:
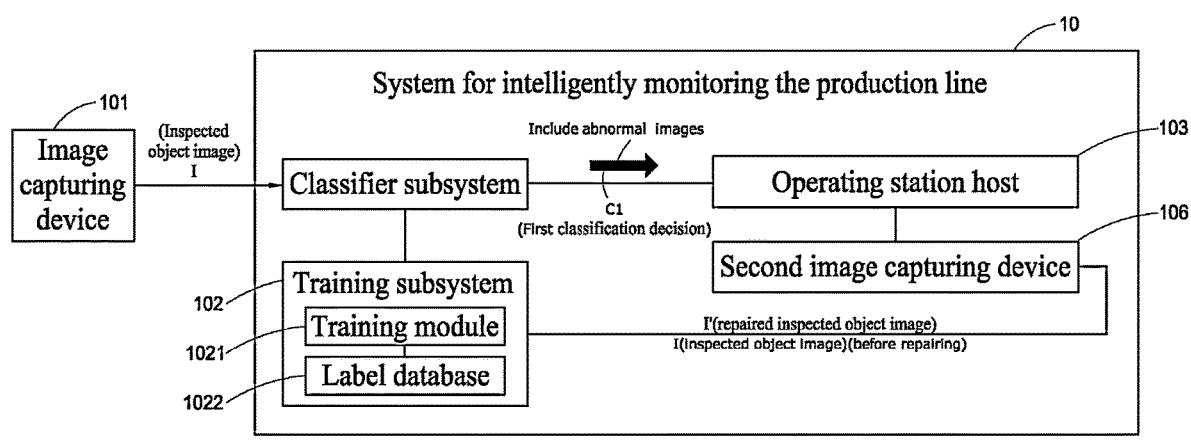
FIG. 11 is a block diagram of a third embodiment of the present disclosure.
Figure 12:
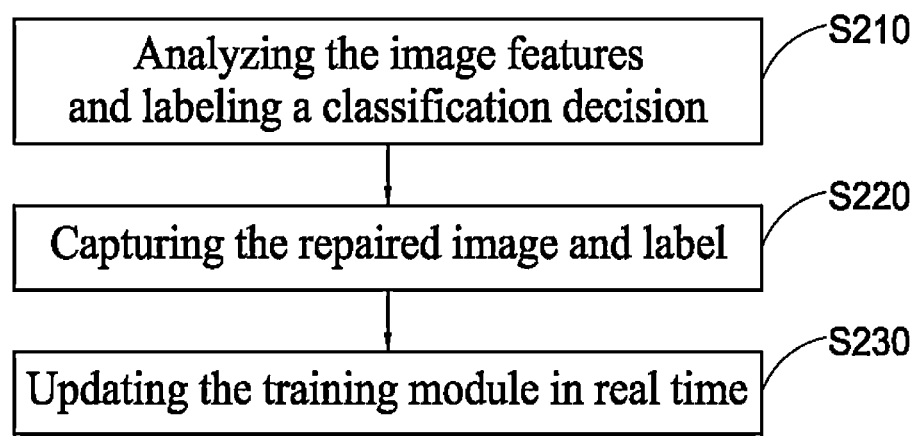
FIG. 12 is a method flowchart of the third embodiment of the present disclosure.

FIG. 11 and FIG. 12 illustrate a third embodiment of the present disclosure. The third embodiment employs the same technology as the first embodiment shown in FIG. 1. The main difference lies in that the system 10 for intelligently monitoring the production line of the third embodiment further includes a second image capturing device 106 respectively connected to the operating station host 103 and the training subsystem 102. The third embodiment of the present disclosure proposes an intelligent production line monitoring method S2. After the classifier subsystem 104 analyzes the image features of the inspected object image I and makes the first classification decision C1 (step S210: analyzing the image features and making a classification decision), the second image capturing device 106 can capture an image of the object repaired according to the abnormal image transmitted by the classifier subsystem 104 (the first classification decision C1 in the present embodiment may not have a reinspection label), thereby obtaining at least one repaired inspected object image I' (step S220: capturing the repaired image and labeling). Meanwhile, at least one image difference feature between the inspected object image I and the repaired inspected object image I' can be labeled by the second image capturing device 106 (for example, based on automatic optical inspection (AOI) technology). The repaired inspected object image I' is regarded as a non-abnormal image and transmitted by the second image capturing device 106 to the training subsystem 102, so that the training subsystem 102 updates the training module 1021, and the label database 1022 connected to the training module 1021 in real time according to the labeled image difference feature and the repaired inspected object image I' (step S230: updating the training module in real time). As an example, the second image capturing device 106 mentioned in the third embodiment can complete the information connection by installing it in the operating station host 103. Moreover, the operating station host 103 itself can also fulfil a repairing function. In addition, the operating station host 103 can be an industrial robot or a consumer robot. The component composition of the second image capturing device 106 can be similar to the image capturing device 101 of the first or the second embodiment, so that no further descriptions thereto are given hereinafter. Also, the operating station host 103 or the classifier subsystem 104 can label the image difference features between the inspected object image I and the repaired inspected object image I'.

For inspected objects whose obsolescence cost is higher than the repair cost and manual repair cost is generally lower than the return cost of the client, such as PCBA plug-in elements (Dual in-line Package, DIP) that needs to be shipped immediately after production, the third embodiment is especially suitable for such objects that require immediate repair. As a result, the labeling module 1031 does not need to run on the operating station host 103. The training subsystem 102 learns to judge the position of the defect and to judge whether there is a defect according to the inspected object image I before and after the repair.

Figure 13:
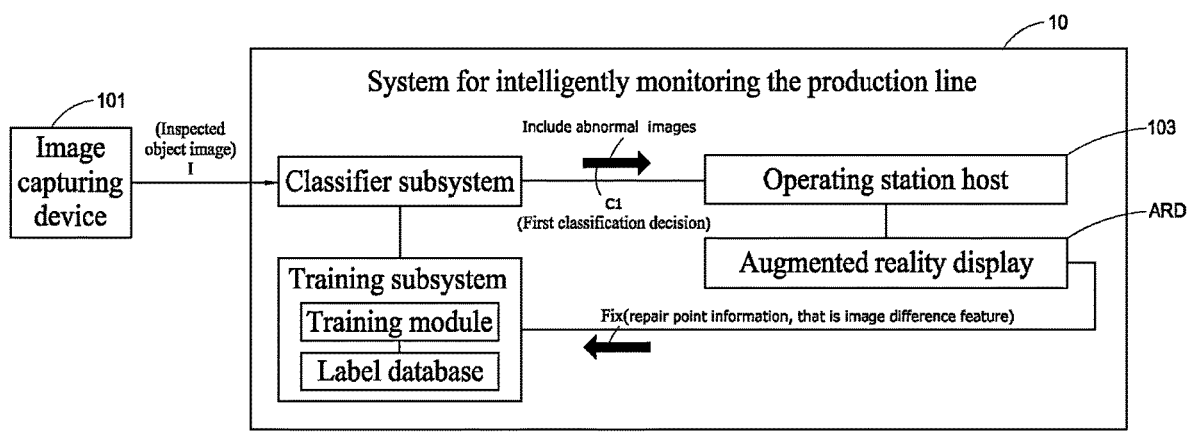
FIG. 13 is a schematic block diagram of a variation of the third embodiment of the present disclosure.

According to FIG. 13, the second image capturing device of the system 10 for intelligently monitoring the production line of the third embodiment can be an augmented reality display ARD on which the abnormal images included in the first classification decision C1 can be displayed. Meanwhile, the reinspection label and the reference image in the first classification decision C1 can also be simultaneously displayed on the augmented reality display ARD. Moreover, the second image capturing device (i.e., the augmented reality display ARD) of the third embodiment can also record a repair point information FIX of the inspected object I during repair. The repair point information FIX will be specified as an image difference feature. The image difference feature will be transmitted by the second image capturing device to the training subsystem 102 so that the training subsystem 102 instantly updates the training module 1021, and the label database 1022 connected to the training module 1021. Accordingly, the third embodiment allows the user to repair the inspected object through the augmented reality display ARD while automatically recording the repair point information of the inspected object. Therefore, the function of replacing the labeling module 1031 shown in FIG. 1 can be achieved without requiring the user to perform the first reinspection operation or the input of the second reinspection operation.

If the image capturing device, the training subsystem, the operating station host, the classifier subsystem, the image correlation analysis module and the second image capturing device referred to in the present disclosure are all physical devices, they may all include a processor with functions such as logic operation, temporary storage of operation results, and storage of execution instruction positions. The processor may be, for example, a central processing unit (CPU), a virtual processor (vCPU), a microprocessor (MPU), a microcontroller (MCU), an application processor (AP), an embedded processor, a Special Application Integrated Circuit (ASIC), a Tensor Processing Unit (TPU) or a Graphics Processing Unit (GPU), etc., but not limited thereto.

The training subsystem, the classifier subsystem, and the image correlation analysis module referred to in the present disclosure can be a server or a software module. The aforementioned server and operating station host can be a physical server, or a server running in the form of a virtual machine (VM), or a server running in the form of a virtual private server, or a public cloud, or a private cloud, or an edge device, or an embedded system or a mobile device (such as a mobile phone), but not limited thereto.

The network referred to in the present disclosure can be a public or private network, such as a wireless network (such as 3G, 4G LTE, Wi-Fi, Bluetooth), a wired network, a local area network (LAN), a wide area network (WA) etc., but not limited to thereto.

The present disclosure can at least improve the industrial process, improve the efficiency and accuracy of defect inspection, is suitable for inspected objects with a small number of training samples, can avoid missing the inspection of defects, can reduce the number of defect reinspection, and can correct the historical misjudgement decisions. Meanwhile, the repaired points can be automatically recorded without reinspecting the results of the classifier. Moreover, the beneficial effects of online real-time training the models can be achieved.

While the present disclosure has been described by preferred embodiments in conjunction with accompanying drawings, it should be understood that the embodiments and the drawings are merely for descriptive and illustrative purpose, not intended for restriction of the scope of the present disclosure. Equivalent variations and modifications performed by person skilled in the art without departing from the spirit and scope of the present disclosure should be considered to be still within the scope of the present disclosure.

LIST OF REFERENCE NUMBERS

10 system for intelligently monitoring the production line
101 image capturing device
102 training subsystem
1021 training module
1022 label database
103 operating station host
1031 labeling module
R reference image
E abnormal image
OP1 first reinspection operation
C1' updated classification decision
OP2 second reinspection operation
C2 second classification decision
1032 historical label reinspection module
HC historical classification decision
OP3 third reinspection operation
HC' updated historical classification decision
104 classifier subsystem
1041 label screening unit
C1 first classification decision
C1_LOW classification decision with lower reliability
T reinspection label
105 image correlation analysis module
106 second image capturing device
ARD augmented reality display
Fix repair point information
I inspected object image
I_G group of the inspected object images
I' repaired inspected object image
S1 method for intelligently monitoring the production line
S105 analyzing a group of images
S110 analyzing image features and making a classification decision
S120 automatic screening and labeling
S130 inputting reinspection operation
S140 updating the training module in real time
S2 intelligent production line monitoring method
S210 analyzing the image features and making a classification decision
S220 capturing the repaired image and label
S230 updating the training module in real time

What is claimed is:

1. A system for intelligently monitoring a production line, especially for monitoring at least one inspected object image captured by an image capturing device, comprising:
a training subsystem circuitry having a training module circuitry corresponding to types of the inspected object;
an operating station host connected to the training subsystem circuitry and having a labeling module circuitry; and
a classifier subsystem circuitry respectively connected to the image capturing device, the training subsystem circuitry, and the operating station host;
wherein the classifier subsystem circuitry is configured to read the training module circuitry to analyze image features of the inspected object image, whereupon a first classification decision is made and transmitted to the operating station host, and if the first classification decision is regarded as abnormal, the first classification decision includes a complete image, and an abnormal image with at least one reinspection label;

wherein the labeling module circuitry is configured to input a first reinspection operation associated with the abnormal image for updating the first classification decision, which is transmitted by the operating station host to the training subsystem circuitry, and the labeling module circuitry is configured to label a missed inspection label associated with the complete image for inputting a second reinspection operation to generate a second classification decision that replaces the first classification decision, which is transmitted by the operating station host to the training subsystem circuitry; and wherein the training subsystem circuitry instantly updates the training module circuitry, and a labeling database connected to the training module circuitry according to an updated classification decision and the second classification decision.

2. The system for intelligently monitoring the production line as recited in claim 1, wherein the classifier subsystem circuitry includes a label screening unit for screening out a classification decision with lower reliability, and the classification decision with lower reliability is transmitted to the operating station host by the classifier subsystem circuitry.

3. The system for intelligently monitoring the production line as recited in claim 1, wherein the operating station host includes a historical label reinspection module circuitry that displays a historical classification decision highly related to the first classification decision, and the historical classification decision includes at least a historical image having a historical label, and the historical label reinspection module circuitry is configured to input a third reinspection operation related to the historical classification decision to update the historical classification decision stored in the training subsystem circuitry.

4. The system for intelligently monitoring the production line as recited in claim 1, wherein at least one inspected object image, which the classifier subsystem circuitry obtains from the image capturing device, is at least one abnormal inspected object image filtered by the image capturing device based on an AOI (Automated Optical Inspection) technology.

5. A system for intelligently monitoring a production line, especially for monitoring at least one inspected object image captured by an image capturing device, comprising:
   a training subsystem circuitry having a training module circuitry corresponding to types of the inspected object;
   an operating station host connected to the training subsystem circuitry and having a labeling module circuitry;
   an image correlation analysis module circuitry connected to the image capturing device for analyzing a group of the inspected object images, thereby obtaining at least one image difference feature by comparison of the group of the inspected object images; and
   a classifier subsystem circuitry respectively connected to the training subsystem circuitry, the image correlation analysis module circuitry, and the operating station host;
wherein the classifier subsystem circuitry is configured to read the training module circuitry to analyze the image difference feature, whereupon a first classification decision is made and transmitted to the operating station host, and if the first classification decision is regarded as abnormal, the first classification decision includes a complete image, and an abnormal image with at least one reinspection label;
wherein the labeling module circuitry is configured to input a first reinspection operation associated with the abnormal image for updating the first classification decision, which is transmitted by the operating station host to the training subsystem circuitry; and wherein the labeling module circuitry is configured to label a missed inspection label associated with the complete image for generating a second classification decision that replaces the first classification decision, which is transmitted by the operating station host to the training subsystem circuitry such that the training subsystem circuitry instantly updates the training module circuitry, and a labeling database connected to the training module circuitry according to an updated classification decision and the second classification decision.

6. The system for intelligently monitoring the production line as recited in claim 5, wherein the classifier subsystem circuitry includes a label screening unit for screening out a classification decision with lower reliability, and the classification decision with lower reliability is transmitted to the operating station host by the classifier sub system circuitry.

7. The system for intelligently monitoring the production line as recited in claim 5, wherein the operating station host includes a historical label reinspection that displays a historical classification decision highly related to the first classification decision, and the historical classification decision includes at least a historical image having a historical label, and the historical label reinspection module circuitry is configured to input a third reinspection operation related to the historical classification decision to update the historical classification decision stored in the training sub system circuitry.

8. The system for intelligently monitoring the production line as recited in claim 5, wherein at least one inspected object image, which the classifier subsystem circuitry obtains from the image capturing device, is at least one abnormal inspected object image filtered by the image capturing device based on an AOI (Automated Optical Inspection) technology.

9. A system for intelligently monitoring a production line, especially for monitoring at least one inspected object image captured by an image capturing device, comprising:
   a training subsystem circuitry having at least one training module circuitry corresponding to types of the inspected object;
   an operating station host;
   a classifier subsystem circuitry respectively connected to the image capturing device, the training subsystem circuitry, and the operating station host, wherein the classifier subsystem circuitry is configured to read the training module circuitry to analyze image features of the inspected object image, whereupon a first classification decision is made and transmitted to the operating station host, and if the first classification decision is regarded as abnormal, the first classification decision includes at least one abnormal image; and
   a second image capturing device respectively connected to the operating station host and the training subsystem circuitry for capturing the inspected object image repaired based on the abnormal image, so as to obtain at least one repaired inspected object image, wherein the repaired inspected object image is regarded as a non-abnormal image, which is transmitted by the second image capturing device to the training subsystem circuitry, so that the training subsystem circuitry updates the training module circuitry, and a label database connected to the training module circuitry in real time according to a labeled image difference feature and the repaired inspected object image.

10. The system for intelligently monitoring the production line as recited in claim 9, wherein the second image capturing device is an augmented reality display for displaying the first classification decision on the augmented reality display, and the second image capturing device is further configured to record a repair point information of the inspected object during repair, so as to specify the repair point information as at least one image difference feature between the inspected object image and the repaired inspected object image, and the image difference feature is transmitted by the second image capturing device to the training subsystem circuitry, so that the training subsystem circuitry updates the training module circuitry, and the label database connected to the training module circuitry in real time according to the labeled image difference feature and the repaired inspected object image.

11. The system for intelligently monitoring the production line as recited in claim 9, wherein at least one inspected object image, which the classifier subsystem circuitry obtains from the image capturing device, is at least one abnormal inspected object image filtered by the image capturing device based on an AOI (Automated Optical Inspection) technology.

12. A method for intelligently monitoring a production line, wherein an image capturing device captures an inspected object image, and after at least one inspected object image is obtained, following steps are performed:
  (A) analyzing an image feature and making a classification decision, wherein a classifier subsystem circuitry reads a training module circuitry to analyze the image feature of the inspected object image, while at least one first classification decision is made and transmitted to an operating station host, and if the first classification decision is regarded as abnormal, the first classification decision includes a complete image, and an abnormal image with a reinspection label;
  (B) automatic screening and labeling, wherein, if the reinspection label is a plurality, the classifier subsystem circuitry screens out a classification decision with lower reliability, which will be transmitted by the classifier subsystem circuitry to the operating station host;
  (C) inputting reinspection operation, wherein a labeling module circuitry of the operating station host inputs a first reinspection operation associated with the abnormal image to update the first classification decision, which will be transmitted by the operation station host to the training subsystem circuitry; and
  (D) updating the training module circuitry in real time, wherein the training subsystem circuitry updates the training module circuitry, and a label database connected to the training module circuitry in real time according to an updated classification decision.

13. The method for intelligently monitoring the production line as recited in claim 12, wherein, when the step (C) is executed, the labeling module circuitry also labels with a missed inspection label associated with the complete image and generates a second classification decision to replace the first classification decision by inputting a second reinspection operation, whereupon the second classification decision is transmitted to the training subsystem circuitry by the operating station host, and whereupon, when the step (D) is executed, the training subsystem circuitry also updates the training module circuitry and the label database in real time according to the second classification decision.

14. The method for intelligently monitoring the production line as recited in claim 12, wherein, when the step (B) is executed, the operating station host displays a historical classification decision that is highly related to the first classification decision, wherein the historical classification decision includes a historical image having at least one historical label, and a historical label reinspection module circuitry is made to input a third reinspection operation associated with the historical classification decision to update the historical classification decision stored in the training subsystem circuitry.

15. The method for intelligently monitoring the production line as recited in claim 12, wherein, before the step (A) is executed, at least one inspected object image, which the classifier subsystem circuitry obtains from the image capturing device, is at least one abnormal inspected object image filtered by the image capturing device based on an AOI (Automated Optical Inspection) technology.

16. A method for intelligently monitoring a production line, wherein an image capturing device captures an inspected object image, and after at least one inspected object image is obtained, following steps are performed:
  (A) analyzing a group of images, wherein an image correlation analysis module circuitry analyzes a group of inspected object images composed of a plurality of the inspected object images, wherein, if the plurality of inspected object images are different, the image correlation analysis module circuitry obtains at least one image difference feature by comparison of the group of the inspected object images, and if the plurality of inspected object images are the same, the image correlation analysis module circuitry transmits the group of the inspected object images to a classifier subsystem circuitry;
  (B) analyzing an image feature and making a classification decision, wherein, if the plurality of inspected object images are different, the classifier subsystem circuitry reads a training module circuitry to analyze image difference features and makes a first classification decision, and wherein, if the plurality of inspected object images are the same, the classifier subsystem circuitry reads the training module circuitry to analyze image features of the plurality of inspected object images and makes the first classification decision, and the first classification decision is transmitted by the classifier subsystem circuitry to an operating station host, and if the first classification decision is regarded as abnormal, the first classification decision includes a complete image, and an abnormal image having at least one reinspection label;
  (C) automatic screening and labeling, wherein, if the reinspection label is a plurality, the classifier subsystem circuitry screens out a classification decision with lower reliability, which will be transmitted by the classifier subsystem circuitry to the operating station host;
  (D) inputting reinspection operation, wherein a labeling module circuitry of the operating station host inputs a first reinspection operation associated with the abnormal image to update the first classification decision, which will be transmitted by the operation station host to the training subsystem circuitry; and
  (E) updating the training module circuitry in real time, wherein the training subsystem circuitry updates the training module circuitry and a label database connected to the training module circuitry in real time according to an updated classification decision.

17. The method for intelligently monitoring the production line as recited in claim 16, wherein, when the step (D)

is executed, the labeling module circuitry also labels with a missed inspection label associated with the complete image and generates a second classification decision to replace the first classification decision by inputting a second reinspection operation, whereupon the second classification decision is transmitted by the operating station host to the training subsystem circuitry, and whereupon, when the step (E) is executed, the training subsystem circuitry also updates the training module circuitry and the label database in real time according to the second classification decision.

18. The method for intelligently monitoring the production line as recited in claim 16, wherein, when the step (C) is executed, the operating station host displays a historical classification decision that is highly related to the first classification decision, wherein the historical classification decision includes a historical image having at least one historical label, and a historical label reinspection module circuitry is made to input a third reinspection operation associated with the historical classification decision to update the historical classification decision stored in the training subsystem circuitry.

19. The method for intelligently monitoring the production line as recited in claim 16, wherein, before the step (A) is executed, at least one inspected object image, which the classifier subsystem circuitry obtains from the image capturing device, is at least one abnormal inspected object image filtered by the image capturing device based on an AOI (Automated Optical Inspection) technology.

20. A method for intelligently monitoring a production line, wherein an image capturing device captures an inspected object image, and after at least one inspected object image is obtained, following steps are performed:

(A) analyzing an image feature and making a classification decision, wherein a classifier subsystem circuitry reads a training module circuitry to analyze image features of the inspected object image, while at least one first classification decision is made and transmitted to an operating station host, and if the first classification decision is regarded as abnormal, the first classification decision includes at least an abnormal image;

(B) capturing a repaired image and labeling, wherein a second image capturing device captures the inspected object repaired based on the abnormal image to obtain at least one repaired inspected object image and label at least one image difference feature between the inspected object image and the repaired inspected object image, and the repaired inspected object image is regarded as a non-abnormal image and transmitted to the training subsystem circuitry by the second image capturing device; and (C) updating the training module circuitry in real time, wherein the training subsystem circuitry updates the training module circuitry and a label database according to the labeled image difference feature and the repaired inspected object image.

21. The method for intelligently monitoring the production line as recited in claim 20, wherein, before the step (A) is executed, at least one inspected object image, which the classifier subsystem circuitry obtains from the image capturing device, is at least one abnormal inspected object image filtered by the image capturing device based on an AOI (Automated Optical Inspection) technology.

* * * * *